United States Patent [19]

Brickner

[11] Patent Number: 5,138,914

[45] Date of Patent: Aug. 18, 1992

[54] SCROLL SAW WRENCH

[76] Inventor: Louis C. Brickner, 255 Catalpa Dr., Pittsburgh, Pa. 15228

[21] Appl. No.: 413,179

[22] Filed: Sep. 27, 1989

[51] Int. Cl.$^5$ .............................................. B25B 23/08
[52] U.S. Cl. ...................................... 81/451; 81/180.1
[58] Field of Search ..................... 81/451, 180.1, 184

[56] References Cited

U.S. PATENT DOCUMENTS

| 4,409,867 | 10/1983 | Lyden | 81/436 |
| 4,736,658 | 4/1988 | Jore | 81/451 |
| 4,800,788 | 1/1989 | Goldstein | 81/451 |

FOREIGN PATENT DOCUMENTS 0264386  4/1950  Fed. Rep. of Germany ........ 81/451

Primary Examiner—Frederick R. Schmidt
Assistant Examiner—Lawrence Cruz
Attorney, Agent, or Firm—Merchant, Gould, Smith, Edell, Welter & Schmidt

[57] ABSTRACT

A wrench for rapid and safe adjustment of a scroll saw blade retaining clamp screw. The wrench provides a parallel guide pin attached to the wrench. The guide pin is inserted into a hole in the blade retaining clamp jaws, aligning and supporting the wrench head relative to the clamp screw.

8 Claims, 3 Drawing Sheets

SCROLL SAW WRENCH

BACKGROUND OF THE INVENTION

The present invention relates to the scroll saw art and more particularly to a specialized wrench structure for quickly releasing the scroll saw blade.

As is known in the art, a screw is used to clamp the scroll saw blade into the blade retention jaws of a scroll saw. This screw may be adjusted with hand held tools such as hex-head wrenches. These wrenches make contact only with the clamp screw and depend on the user to carefully maintain the alignment. The user's concentration must be focused on the wrench alignment, at the expense of other tasks. Misalignment results in accelerated wear on the retention screw and wrench head. Additionally, hexagonal wrenches come in a wide variety of sizes. Accidental use of the wrong size wrench will also accelerate wear. Finally, a hexagonal wrench is generally constructed from a single piece of hexagonal shaped extrusion, with an L-shaped bend for a handle. Consequently, to compensate for distortion from rotational torque, the length of wrenches with smaller cross sections is limited. The prior art addressed these problems by providing a separate pin for stabilizing the blade chuck while the operator used a conventional T-handle wrench to adjust the clamp screw.

. SUMMARY OF THE INVENTION

In contrast to the prior art, the present invention provides a wrench with a handle for applying torque, attached to a guide pin. The principle object of the invention is to provide a wrench which is easy to use quickly to permit improved productivity. The wrench includes a guide pin that aligns and supports the wrench relative to the clamp screw for rapid and safe adjustment to the clamp screw. The guide pin is attached parallel to the wrench by two or more brackets. The brackets allow the wrench to rotate freely. The blade clamp structure has a hole into which the guide pin is inserted. The distance between the hole in the blade housing and the clamp screw is the same as that between the guide pin and the wrench head. The guide pin is inserted into the blade clamp structure, which positions the wrench for easy and rapid operation with one hand and minimizes misalignment that leads to accelerated wear of the clamp screw. The added support provided by the guide also allows for a longer handle on the wrench by reinforcing the wrench against rotational distortion, even for wrenches with a small cross section. The longer handle also keeps the operator's hand a more convenient distance from the saw blade and the work piece.

Another object of the invention is to prevent the wrong sized wrench from being used by accident, on a clamp screw. In machines which use two or more distinct types of clamp screws, the distance between the guide pin and the wrench assembly is intentionally made different for each type of tool. If the user attempts to use the wrong wrench, the distance between the guide pin and the wrench head is such that the wrench head will not align with the clamp screw, thereby preventing the wrong wrench from mistakenly being used.

Another object of the invention is to provide a wrench which stabilizes the blade chuck while the clamp screw is adjusted to prevent bending of the blade.

These and other objects, features and advantages of the invention will become apparent upon reading of the following detailed specifications and drawings.

DETAILED DESCRIPTION OF THE PREFERRED EMBODIMENT

Figure 1:
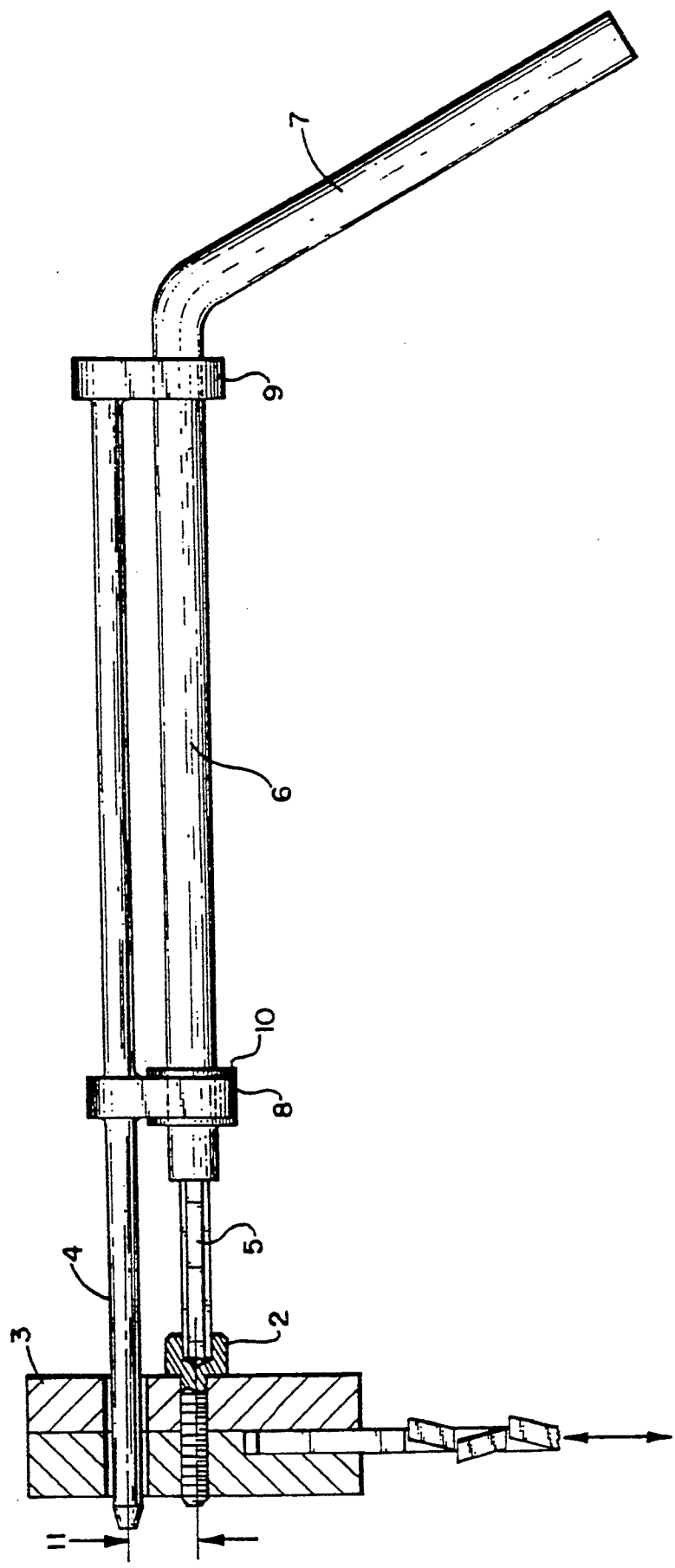
FIG. 1 is a partial cut away side view of the scroll saw wrench engaged in the scroll saw blade retaining structure.
Figure 2:
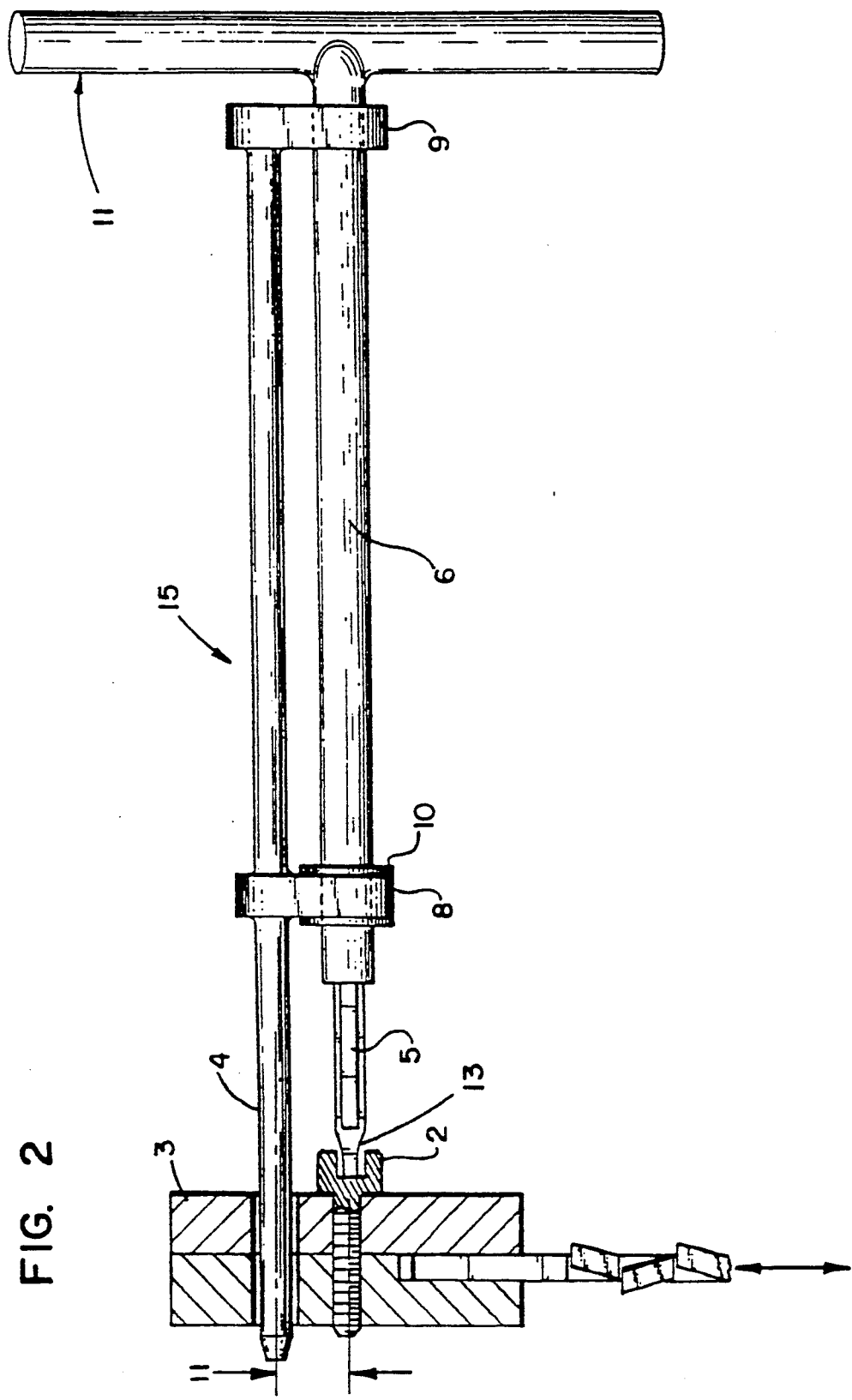
FIG. 2 is a partial cut away side view of an alternate embodiment of the scroll saw wrench engaged in the scroll saw blade retaining structure.
Figure 3:
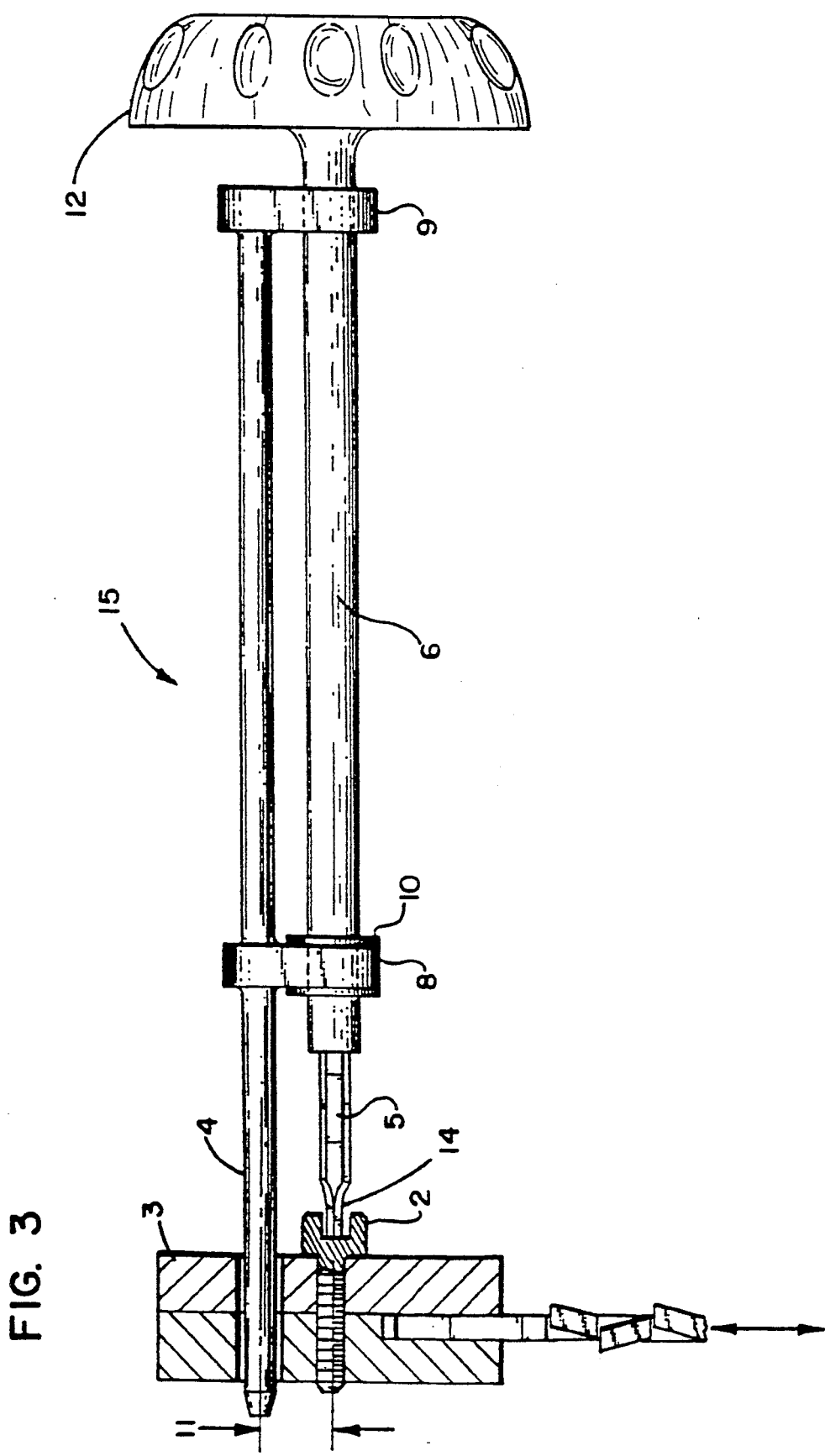
FIG. 3 is a partial cut away side view of an alternate embodiment of the scroll saw wrench engaged in the scroll saw blade retaining structure.

The Figure shows a scroll saw wrench 15 for adjusting a scroll saw blade clamp screw 2, including a body member 6 with a hexagonal shaped head 5 on one end and a L-shaped handle 7 for applying rotational torque on the other. The guide pin 4 is attached parallel by the use of two spaced brackets 8 and 9. The wrench portion of the tool is prevented from sliding out of the brackets by collar 10, located at one bracket 8.

Although the invention is disclosed in the context of a hexagonal shaped wrench head 5, it should be clear that other fastener heads may be substituted without departing from the scope of the invention. Alternative wrench heads include, but are not limited to, hexagonal 5, phillips, star 14, and slotted 13 configurations.

Likewise, the invention is disclosed in the context of a L-shaped handle configurations 7. It is equally clear that other handles are contemplated, which do not depart from the scope of the invention. Alternative handles include, but are not limited to, T-shaped 11, crank and knob 12 configurations.

The guide pin 4 extends beyond the end of the hexagonal shaped head 5 and is inserted into the hole in the scroll saw blade clamp jaws 3, without engaging the clamp screw 2. The hexagonal shaped head 5 is then aligned with the scroll saw clamp screw 2 and engaged. When the guide pin 4 is completely inserted in the scroll saw blade clamp jaws hole 3, the scroll saw wrench is accurately aligned and self-supporting. The clamp screw 2 is adjusted by applying torque to handle 7.

In machines which use two or more distinct types of clamp screws 2, the distance 11 between the centerline of the guide pin 4 and the wrench head 5 is intentionally varied for each type of tool. If the user attempts to use the wrong wrench, the wrench head 5 will not align with the clamp screw 2 because the distance 9 between the centerline of the guide pin 4 and the wrench head 5 is not equal to the distance 9.

What is claimed is:

1. A scroll saw wrench for adjusting a blade retention clamp screw on a scroll saw blade clamp jaws with a guide hole, adjacent to the clamp screw, comprising:
    a body member having adjustment means for rotationally adjusting said clamp screw, and having means for applying rotational torque to said adjustment means;
    an offset guide member for aligning said body member with said clamp screw, said offset guide member providing rotational support to said body member and extending beyond the end of the adjustment means whereby said wrench is self-supporting when said guide member is inserted into said scroll saw blade clamp jaws;

attachment means for holding said body member in an offset parallel and spaced relationship to said guide member and for allowing rotational movement of said body member.

2. A scroll saw wrench according to claim 1 wherein said adjustment means comprises;

a hex shaped wrench head for rotationally adjusting said clamp screw.

3. A scroll saw wrench according to claim 1 wherein said adjustment means comprises;

a slotted screw wrench head for rotationally adjusting said clamp screw.

4. A scroll saw wrench according to claim 1 wherein said adjustment means comprises;

a six-pointed star shaped wrench head for rotationally adjusting said clamp screw.

5. A scroll saw wrench according to claim 1 wherein said means for applying rotational torque comprises;

a manually operated handle means coupled to said body member.

6. A scroll saw wrench according to claim 5 wherein said handle means for applying rotational torque to said body member comprises;

an L-shaped handle.

7. A scroll saw wrench according to claim 5 wherein said handle means for applying rotational torque to said body member comprises a T-shaped handle.

8. A scroll saw wrench according to claim 5 wherein said handle means for applying rotational torque to said body member comprises;

a knob shaped handle.

* * * * *